(12) United States Patent
Braz et al.

(10) Patent No.: US 10,075,252 B2
(45) Date of Patent: *Sep. 11, 2018

(54) TELECOMMUNICATION SYSTEM USING MULTIPLE NYQUIST ZONE OPERATIONS

(71) Applicant: CommScope Technologies LLC, Hickory, NC (US)

(72) Inventors: Oliver Braz, Monheim (DE); Markus Mederle, Tapfheim (DE); Alfons Dussmann, Gansheim (DE); Van E. Hanson, Forest, VA (US); Nelson Christian Schmidt, Jr., Lexington, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,481

(22) Filed: May 27, 2017

(65) Prior Publication Data

US 2017/0264386 A1 Sep. 14, 2017

Related U.S. Application Data

(63) Continuation of application No. 15/169,017, filed on May 31, 2016, now Pat. No. 9,667,368, which is a
(Continued)

(51) Int. Cl.
*H04J 1/08* (2006.01)
*H04B 1/00* (2006.01)
*H04W 72/04* (2009.01)

(52) U.S. Cl.
CPC ............... *H04J 1/08* (2013.01); *H04B 1/005* (2013.01); *H04B 1/0007* (2013.01); *H04W 72/0453* (2013.01)

(58) Field of Classification Search
CPC .... H04B 7/15585; H04B 1/003; H04B 1/406; H04B 1/71637; H04B 1/0014;
(Continued)

(56) References Cited

U.S. PATENT DOCUMENTS 5,280,636 A 1/1994 Kelley et al.
5,602,847 A 2/1997 Pagano et al.
(Continued)

FOREIGN PATENT DOCUMENTS

DE 102011120827 6/2013
EP 2698921 2/2014

OTHER PUBLICATIONS

European Patent Office, "Extended Search Report for EP Patent Application No. 13180603.6", "from Foregin Counterpart of U.S. Appl. No. 13/967,534", dated Jul. 11, 2014, pp. 1-8, Published in: EP.
(Continued)

*Primary Examiner* — Brian O'Connor
(74) *Attorney, Agent, or Firm* — Fogg & Powers LLC

(57) ABSTRACT

Telecommunication systems using multiple Nyquist zone operations are provided. In one aspect, a telecommunication system can include a first section and a second section. The first section can receive signals from at least one transmitting base station or transmitting terminal device. The received signals have frequencies in multiple frequency bands. The first section can also sample the received signals such that the received signals are aliased. The first section can also combine the aliased signals from the frequency bands into a combined frequency band in a common Nyquist zone. The second section can extract signals from the combined frequency band. The extracted signals are to be transmitted at frequencies in a frequency band from a Nyquist zone that is different than the common Nyquist
(Continued)

zone. The second section can also transmit the extracted signals to at least one receiving base station or receiving terminal device. Other embodiments are disclosed.

20 Claims, 9 Drawing Sheets

Related U.S. Application Data continuation of application No. 13/967,534, filed on Aug. 15, 2013, now Pat. No. 9,614,629.

(60) Provisional application No. 61/683,431, filed on Aug. 15, 2012.

(58) Field of Classification Search
CPC ......... H04B 1/0007; H04B 1/005; H04J 1/08; H04W 72/0453
See application file for complete search history.

(56) References Cited

U.S. PATENT DOCUMENTS

| | | | |
|---|---|---|---|
| 6,574,459 | B1 | 6/2003 | Kaminski et al. |
| 6,678,512 | B1 | 1/2004 | Kaminski et al. |
| 7,203,488 | B2 | 4/2007 | Luneau |
| 7,436,911 | B2 | 10/2008 | Fudge et al. |
| 7,436,912 | B2 | 10/2008 | Fudge et al. |
| 7,583,650 | B2 | 9/2009 | Collados Asensio et al. |
| 7,724,806 | B2 | 5/2010 | Franck et al. |
| 7,809,047 | B2 | 10/2010 | Kummetz |
| 8,059,755 | B2 | 11/2011 | Hunter et al. |
| 8,064,560 | B2 | 11/2011 | Hunter et al. |
| 8,078,130 | B2 | 12/2011 | Fudge et al. |
| 8,149,894 | B2 | 4/2012 | Fudge |
| 8,401,050 | B1 | 3/2013 | Fudge et al. |
| 8,577,324 | B2 | 11/2013 | Kim et al. |
| 8,724,664 | B2 | 5/2014 | Stapleton et al. |
| 9,236,897 | B2 | 1/2016 | Stapleton et al. |
| 9,667,368 | B2 * | 5/2017 | Braz ................ H04J 1/08 |
| 2007/0086544 | A1 | 4/2007 | Fudge et al. |
| 2009/0052556 | A1 | 2/2009 | Fernandez |
| 2010/0166112 | A1 | 7/2010 | Drennen, III |
| 2010/0189208 | A1 | 7/2010 | Fudge et al. |
| 2010/0330949 | A1 | 12/2010 | Kim et al. |
| 2011/0299630 | A1 | 12/2011 | Petrovic |
| 2012/0076249 | A1 | 3/2012 | Seo et al. |
| 2012/0140859 | A1 | 6/2012 | Lehr et al. |
| 2014/0010168 | A1 | 1/2014 | Stapleton et al. |
| 2014/0050212 | A1 | 2/2014 | Braz et al. |
| 2014/0206282 | A1 | 7/2014 | Stapleton et al. |

OTHER PUBLICATIONS

European Patent Office, "Communication Pursuant to Article 94(3) for EP Patent Application No. 13180603.6", "Foreign Counterpart to U.S. Appl. No. 13/967,534", dated Dec. 22, 2017, pp. 1-6, Published in: EP.

U.S. Patent Office, "Notice of Allowance", "from U.S. Appl. No. 13/967,534", dated Dec. 14, 2015, pp. 1-6, Published in: US.

U.S. Patent Office, "Office Action", "from U.S. Appl. No. 13/967,534", dated Jul. 17, 2015, pp. 1-33, Published in: US.

U.S. Patent Office, "Notice of Allowance", "from U.S. Appl. No. 15/169,017", dated Jan. 27, 2017, pp. 1-12, Published in: US.

U.S. Patent Office, "Office Action", "from U.S. Appl. No. 15/169,017", dated Sep. 9, 2016, pp. 1-18, Published in: US.

"3rd Generation Partnership Projection; Technical Specification Group Radio Access Network; Evolved Universal Terrestrial Radio Access (E-UTRA); FDD Repeater radio transmission and reception; (Release 8)", "3rd Generation Partnership Project, Sep. 2008", pp. 1-37.

800 MHz Transition Administrator, LLC, "800MHz Band Reconfiguration Handbook", "800MHz Transition Administrator, Jan. 19, 2011", Jan. 19, 2011, pp. 1-129.

Chen et al., "A 10b 600MS/s Multi-mode CMOS DAC for Multiple Nyquist Zone Operation", "Symposium on VLSI Circuits Digest of Technical Papers, 2011", Jun. 15-17, 2011, pp. 66-67.

"ECC Decision of Oct. 30, 2009 on harmonised conditions for mobile/fixed communications networks (MFCN) operating in the band 790-862 MHz", "Electronic Communications Committee", Oct. 30, 2009, pp. 1-18, Publisher: ECC/DEC/(09)03.

Liou et al., "Wideband Signal Detection by Employing Differential Sampling Rates", "Proceedings of the 2011 National Aerospace and Electronics Conference (NAECON)", Jul. 20-22, 2011, pp. 154-161, Publisher: IEEE.

"Digital Dividend: Cognitive access: Statement on licence-exempting cognitive devices using interleaved spectrum", Jul. 1, 2009, pp. 1-45, Publisher: Ofcom, Published in: United Kingdom.

Pace et al., "Nyquist Folding Analog-to-Information Receiver: Autonomous Information Recovery Using Quadrature Mirror Filtering", Nov. 1-4, 2009, pp. 1581-1585, Publisher: IEEE.

Vaughan et al., "The Theory of Bandpass Sampling", "IEEE Transactions on Signal Processing, Sep. 1991", pp. 1973-1984, vol. 39, No. 9, Publisher: IEEE.

International Telecommunication Union, "World Radiocommunication Conference sets future course: 153 countries sign treaty governing spectrum and satellite orbits", "International Telecommunication Union, Feb. 17, 2012", Feb. 17, 2012, pp. 1-2.

Zeng et al., "Parameter Estimation of LFM Signal Intercepted by left sideband synchronous Nyquist folding receiver", "Yuhang Xuebao/Journal of Astronautics, Jun. 2012", pp. 1-2, vol. 33, No. 6.

* cited by examiner

TELECOMMUNICATION SYSTEM USING MULTIPLE NYQUIST ZONE OPERATIONS

CROSS-REFERENCE TO RELATED APPLICATION

This application is a continuation of U.S. patent application Ser. No. 15/169,017, filed May 31, 2016 and titled "Telecommunication System Using Multiple Nyquist Zone Operations", which is a continuation of U.S. patent application Ser. No. 13/967,534, filed Aug. 15, 2013 and titled "Telecommunication System Using Multiple Nyquist Zone Operations" (Issued as U.S. Pat. No. 9,614,629), which claims the benefit of U.S. Provisional Application Ser. No. 61/683,431, filed Aug. 15, 2012 and titled "Telecommunication System Using Multiple Nyquist Zone Operations," wherein the contents of all of the foregoing applications are hereby incorporated herein by reference.

TECHNICAL FIELD

The present invention relates generally to telecommunication and more particularly (although not necessarily exclusively) to telecommunication systems using multiple Nyquist zone operations.

BACKGROUND

A communication device in a telecommunication system, such as a repeater, can establish multiple communication links over multiple interfaces. The communication device may be limited in its use of frequency bands. Some regions, such as Europe, have added additional frequency bands for use by telecommunication systems. Using multiple frequency bands in interfaces for devices in telecommunication systems is challenging.

SUMMARY

Certain aspects and features of the present invention are directed to telecommunication systems using multiple Nyquist zone operations.

In one aspect, a telecommunication system is provided. The telecommunication system can include a first section and a second section. The first section can receive signals from at least one transmitting base station or at least one transmitting terminal device. The received signals have frequencies in multiple frequency bands. The first section can also sample the received signals such that the received signals are aliased. The first section can also combine the aliased signals from the frequency bands into a combined frequency band in a common Nyquist zone. The second section can extract signals from the combined frequency band. The extracted signals are to be transmitted at frequencies in a frequency band from a Nyquist zone that is different than the common Nyquist zone. The second section can also transmit the extracted signals to at least one receiving base station or at least one receiving terminal device.

In another aspect, a method is provided. The method involves receiving signals from at least one transmitting base station or at least one transmitting terminal device. The received signals have frequencies in multiple frequency bands. The method also involves sampling the received signals such that the received signals are aliased. The method also involves combining the aliased signals from the frequency bands into a combined frequency band in a common Nyquist zone. The method also involves extracting signals from the combined frequency band. The extracted signals are to be transmitted at frequencies in a frequency band from a Nyquist zone that is different than the common Nyquist zone. The method also involves transmitting the extracted signals to at least one receiving base station or at least one receiving terminal device.

In another aspect, a distributed antenna system is provided. The distributed antenna system can include a master unit communicatively coupled to a base station and a remote unit communicatively coupled to the master unit. The master unit can receive downlink signals from the base station. The downlink signals have frequencies in multiple frequency bands. The master unit can also sample the downlink signals such that the downlink signals are aliased. The master unit can also combine the aliased downlink signals from the frequency bands into a combined frequency band in a common Nyquist zone. The remote unit can extract uplink signals from the combined frequency band. The extracted signals are to be transmitted at frequencies in a frequency band from a Nyquist zone that is different than the common Nyquist zone. The remote unit can also transmit the extracted signals to at least one receiving base station or at least one receiving terminal device.

These illustrative aspects and features are mentioned not to limit or define the invention, but to provide examples to aid understanding of the concepts disclosed in this application. Other aspects, advantages, and features of the present invention will become apparent after review of the entire application.

DETAILED DESCRIPTION

Figure 1:
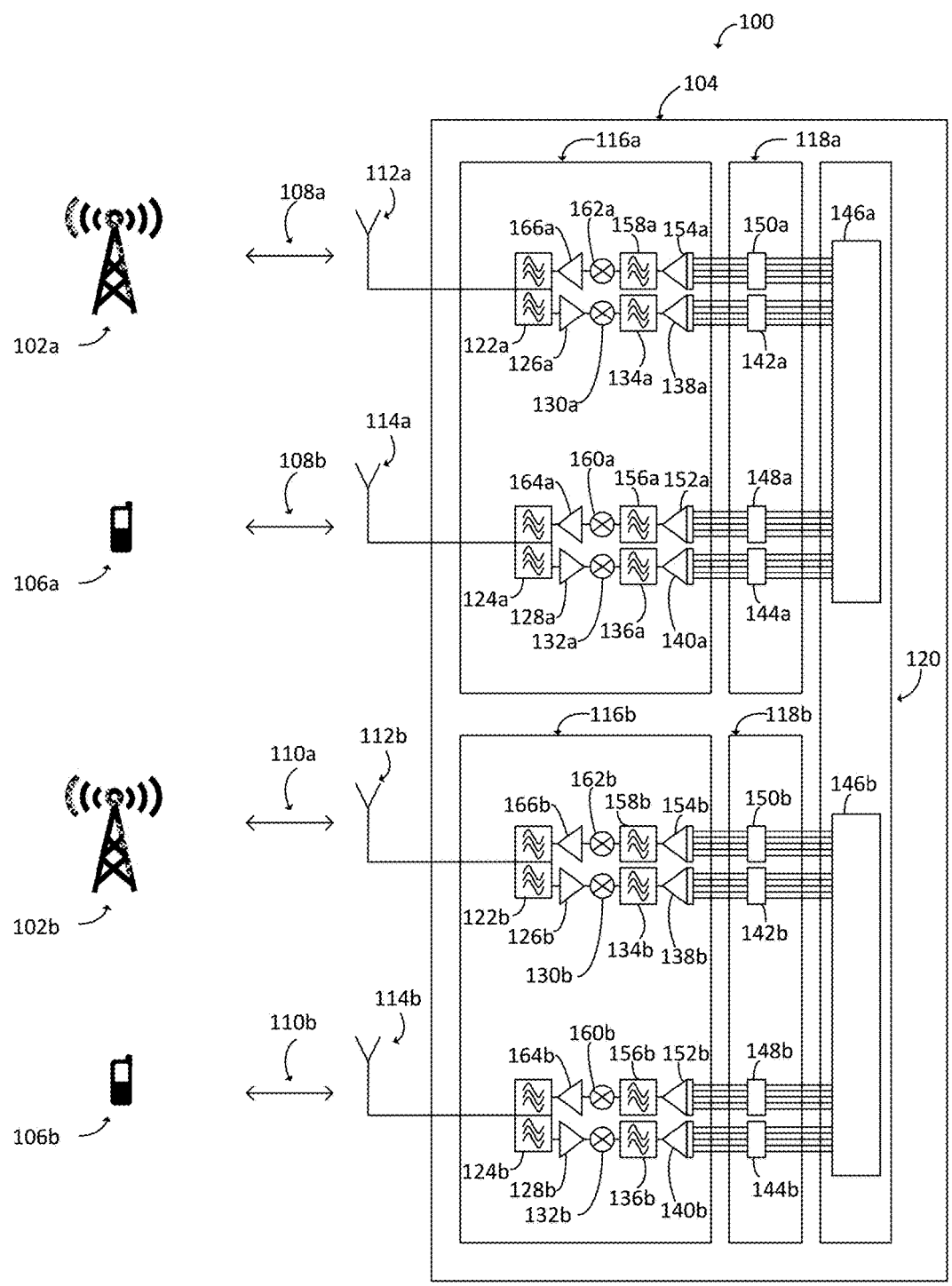
FIG. 1 is a schematic diagram of a repeater system configured for communicating signals using multiple frequencies bands according to one aspect.

Certain aspects and examples are directed to devices or groups of devices in a telecommunication system, such as (but not limited to) a repeater system or a distributed antenna system, that can use multiple Nyquist zone operations to provide communication links with multiple frequency bands on a single interface. For example, signals from multiple frequency bands can be sampled such that the frequency bands are intentionally aliased in the discrete time domain. Over-folding the aliased frequency bands can allow multiple combined frequency bands to be included in one Nyquist zone, such as the first Nyquist zone. Each of multiple filters can extract or otherwise select a respective desired frequency band from a different Nyquist zone.

In some aspects, a telecommunication system can include a first section and a second section. Each of the sections can include devices, circuitry, and/or other components for receiving, transmitting, and/or processing signals communicated between base stations and terminal devices. The first section can include devices, circuitry, and/or other components for receiving signals having frequencies in multiple frequency bands. Signals can be received from one or more transmitting base stations and/or one or more transmitting terminal devices. The first section can include one or more components for sampling the signals such that the signals are aliased. The first section can also include one or more components for combining the signals from the frequency bands in a Nyquist zone. The second section can extract signals from the combined frequency bands. Some of the extracted signals can be frequency-shifted for transmission by the second section. The frequency-shifted signals can have frequencies in one or more Nyquist zones different from the Nyquist zone used for combining the frequency bands. The second section can transmit the signals having the frequencies in the first frequency band and the second frequency band to a receiving base station or a receiving terminal device.

In some aspects, the same base station can be both a transmitting base station that transmits downlink signals to a receiving terminal device and a receiving base station that receives uplink signals originating from a transmitting terminal device. In other aspects, the transmitting base station that transmits downlink signals to a receiving terminal device can be different from a receiving base station that receives uplink signals originating from a transmitting terminal device.

In some aspects, the same terminal device can be both a transmitting terminal device that transmits uplink signals to a receiving base station and a receiving terminal that receives downlink signals originating from a transmitting base station. In other aspects, the terminal device that transmits uplink signals to a receiving base station can be different from a receiving terminal device that receives downlink signals originating from a transmitting base station.

In some aspects, the telecommunication system can be a repeater. The first section can include one or more receiver sections of the repeater, such as a downlink receiver section with a donor antenna that can receive downlink signals and an uplink receiver section with a coverage antenna that can receive uplink signals. The second section can include one or more transmitter sections, such as a downlink transmitter section with a coverage antenna for transmitting the downlink signals and an uplink transmitter section with a donor antenna for transmitting the uplink signals.

In other aspects, the telecommunication system can be a distributed antenna system. The distributed antenna can include a master unit in communication with a base station and one or more remote units in communication with the master unit and mobile devices. The first section can be included in the master unit. The master unit can receive downlink signals from the base station having frequencies at multiple frequency bands. The second section can be included in the remote unit. The remote unit can transmit extracted downlink signals at the frequencies from the second and third Nyquist zones to the mobile devices.

The telecommunication system can select received signals at specified frequency bands from a group of received frequency bands. For example, the telecommunication system can include multiple filters. Each filter can be configured for selecting a respective frequency band of the frequency bands corresponding. For example, a first filter can select a frequency band corresponding to one Nyquist zone and a second filter can select a frequency band corresponding to a different Nyquist zone. In some aspects, the Nyquist zones for the selected frequency bands can be Nyquist zones that are not adjacent with respect to one another, such as a second and fourth Nyquist zone. The telecommunication system can also include a combiner or other suitable device that can combine the signals in the selected frequency bands for sampling by an analog-to-digital converter.

In some aspects, the telecommunication system can also include one or more down-conversion stages. A down-conversion stage can include one or more devices, components, or groups of devices and components used to convert and RF signal to an intermediate frequency ("IF") signal. Down-converting received RF signals to IF signals can provide improved frequency selectivity with respect to the filters used to select frequency bands corresponding to different Nyquist zones.

In some aspects, the down-conversion stage can provide individualized down-conversion by using dedicated mixers for different desired frequency bands of the received signals. For example, a first mixer can down-convert a first frequency band by a first amount and a second mixer can down-convert a second frequency band by a second amount different from the first frequency amount. Using different mixers to perform different amounts of down-conversion can provide flexibility to move received signals of interest within an IF frequency bandwidth relative to a sampling rate used to sample the IF signals. For example, RF signals in widely spaced frequency bands of interest can be down-converted to IF frequency bands that correspond to the Nyquist zones used by the telecommunication system for combining different signals. In other aspects, each of the received signals can be down-converted by a common mixer.

As used herein, the term "terminal device" can refer to an electronic device used to communicate voice and/or data via a telecommunications system, such as (but not limited to) a cellular network. Non-limiting examples of terminal devices can include mobile stations, mobile devices, access terminals, subscriber stations, mobile terminals, remote stations, user terminals, subscriber units, cellular phones, smart phones, personal digital assistants ("PDAs"), laptop computers, netbooks, e-readers, wireless modems, etc.

Detailed descriptions of certain aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects but, like the illustrative aspects, should not be used to limit the present invention.

FIG. 1 is a schematic diagram of a telecommunication system configured for communicating signals using multiple frequencies bands according to one aspect. FIG. 1 depicts a telecommunication system 100, such as a wireless communication system, that can include base stations 102a, 102b (such as base transceiver stations ("BTS")) and a repeater 104. The repeater 104 can communicate with the base stations 102a, 102b and with terminal devices 106a, 106b via communication links 108a, 108b, 110a, 110b. Non-limiting examples of the communication links 108a, 108b, 110a, 110b can include radio links established using a Global System for Mobile Communications ("GSM") technology, such as GSM-900 links, and communication links established using a Long Term Evolution ("LTE") technology, such as LTE 800 links. The communication links 108a, 108b between a base station 102a and a terminal device 106a or other terminal device can be established via a repeater 104. The communication links 110a, 110b between a base station 102b and a terminal device 106b or other terminal device can also be established via the repeater 104. For each of the communication links 108a, 108b, 110a, 110b, donor antennas 112a, 112b can be used to establish downlink paths from the base stations 102a, 102b to the repeater 104 and uplink paths from the repeater 104 to the base stations 102a, 102b. In additional or alternative aspects, both of the donor antennas 112a, 112b can be combined in a single donor antenna.

For each of the communication links 108a, 108b, 110a, 110b, the coverage antennas 114a, 114b can be used to establish uplink paths from the terminal devices 106a, 106b to the repeater 104 and downlink paths from the repeater 104 to the terminal devices 106a, 106b. In additional or alternative aspects, both coverage antennas 114a, 114b can be implemented as a single combined coverage antenna or as a distributed antenna system ("DAS") having multiple coverage antennas.

The repeater 104 can include one or more components providing a donor side and one or more components providing a coverage side. A donor side can include devices, components, or some combination thereof used for communication of signals to and from one or more base stations. A coverage side can include devices, components, or some combination thereof used for communication of signals to and from one or more terminal devices. The donor side and the coverage side can each include a downlink path and an uplink path.

Donor side and coverage side signals received via each of the communication links 108a, 108b, 110a, 110b can be processed by the repeater 104 using the respective RF cards 116a, 116b, the respective interfaces 118a, 118b, and a processor 120. On the donor side, downlink signals from base stations 102a, 102b are received via the antennas 112a, 112b and isolated from the donor uplink paths using the duplexers 122a, 122b. Downlink signals on the donor side are processed by the RF cards 116a, 116b using low noise amplifiers 126a, 126b, mixers 130a, 130b, filters 134a, 134b and analog-to-digital converters 138a, 138b. Uplink signals on the donor side are processed by the RF cards 116a, 116b using digital-to-analog converters 154a, 154b, filters 158a, 158b, mixers 162a, 162b, and power amplifiers 166a, 166b. Uplink signals on the donor side are transmitted to the base stations 102a, 102b via the antennas 112a, 112b. On the coverage side, uplink signals from terminal devices 106a, 106b are received via the antennas 114a, 114b and isolated from the coverage uplink paths using the duplexers 124a, 124b. Uplink signals on the coverage side are processed by the RF cards 116a, 116b using low noise amplifiers 128a, 128b, mixers 132a, 132b, filters 136a, 136b and analog-to-digital converters 140a, 140b. Downlink signals on the coverage side are processed by the RF cards 116a, 116b using digital-to-analog converters 152a, 152b, filters 156a, 156b, mixers 160a, 160b, and power amplifiers 164a, 164b. Uplink signals on the coverage side are transmitted to the base stations 102a, 102b via the antennas 114a, 114b.

In some aspects, the repeater 104 can use frequency division multiplexing. A repeater 104 using frequency division multiplexing can split or otherwise separate RF signals. Splitting or otherwise separating RF signals can allow for filtering and amplifying the downlink signals and uplink signals. On the donor side, RF signals can be split or otherwise separated by duplexers 122a, 122b. On the coverage side, RF signals can be split or otherwise separated by duplexers 124a, 124b. Non-limiting examples of the duplexers 122a, 122b, 124a, 124b include uplink/downlink duplexers. In additional or alternative aspects, the repeater 104 can use time division multiplexing. A repeater that uses time division multiplexing can include switches in addition to or instead of the duplexers 122a, 124a.

The repeater 104 can include low noise amplifiers for amplifying received signals. Downlink signals received from the duplexers 122a, 122b can be respectively amplified by low noise amplifiers 126a, 126b. Uplink signals received from the duplexers 124a, 124b can be amplified by low noise amplifiers 126a, 126b, 128a, 128b.

The repeater 104 can also include down-conversion stages for down-converting received RF signals to IF. A down-conversion stage can include a down-mixer. Downlink signals outputted by the low noise amplifiers 126a, 126b can be down-converted by frequency down mixers 130a, 130b. Uplink signals outputted by the low noise amplifier 128a, 128b can be down-converted by frequency down mixers 132a, 132b.

The repeater 104 can include multiple filters for selecting frequency bands corresponding to multiple Nyquist zones. The filters can select received signals having frequencies in frequency bands corresponding to Nyquist zones. The filters 134a, 134b can select Nyquist zones for received signals in a downlink direction. The filters 136a, 136b can select Nyquist zones for received signals in an uplink direction. Non-limiting examples of the filters 134a, 134b, 136a, 136b include surface acoustic wave ("SAW") filters, frequency selective filters, bandpass filters, etc.

The repeater 104 can sample the received signals such that received signals in the selected frequency bands are aliased in a common Nyquist zone. Analog-to-digital converters 138a, 138b can sample received signals in a downlink direction. Analog-to-digital converters 140a, 140b can sample received signals in an uplink direction. In some aspects, additional amplifiers and variable attenuators can be used to modify signal levels of one or more of the received signals to effectively utilize the dynamic range of an analog-to-digital converters 138a, 138b in a downlink direction and analog-to-digital converters 140a, 140b in an uplink direction. An example of using additional amplifiers and variable attenuators to adapt an input signal level to effectively utilize the dynamic range of analog-to-digital converters is described in U.S. Pat. No. 7,809,047 to Kummetz.

The processor 120 can receive digitized downlink received signals via downlink receive interfaces 142a, 142b. The processor 120 can receive digitized uplink receive via uplink receive interfaces 144a, 144b. Non-limiting examples of a processor 120 include a microprocessor, a peripheral interface controller ("PIC"), an application-specific integrated circuit ("ASIC"), a field-programmable gate array ("FPGA"), or other suitable processing device.

The processor 120 can include programmable filters 146a, 146b. The programmable filters 146a, 146b can digitally filter and/or adjust the gain of signals communicated via the communication links 108a, 108b, 110a, 110b. Some or all of a frequency band can be filtered based on the filter coefficients with which the programmable filters 146a, 146b are configured.

Transmit signals can be extracted from the combined received signals for transmission via the donor antennas 112a, 112b on the donor side or the coverage antennas 114a, 114b on the coverage side. Digital data from the programmable filters 146a, 146b can be provided via downlink transmit interfaces 148a, 148b to the coverage side. Digital data from the programmable filters 146a, 146b can be provided via uplink transmit interfaces 150a, 150b to the donor side.

The RF card 116a can also include digital-to-analog converters 152a, 154a, filters 156a, 158a, frequency up mixers 160a, 162a, and power amplifiers 164a, 166a. The RF card 116b can also include digital-to-analog converters 152b, 154b, filters 156b, 158b, frequency up mixers 160b, 162b, and power amplifiers 164b, 166b.

In a downlink direction, the digital-to-analog converters 152a, 152b can convert a data stream into an analog signal in the analog domain. In an uplink direction, the digital-to-analog converters 154a, 154b can convert a data stream into an analog signal in the analog domain.

Figure 2:
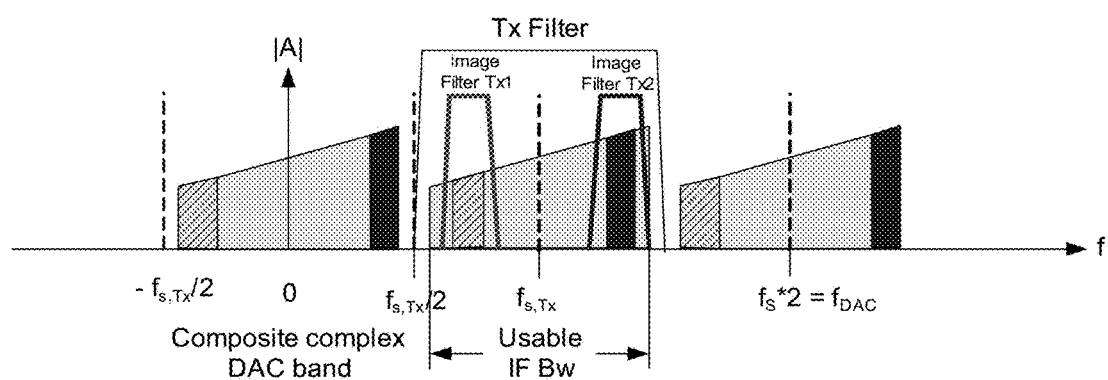
FIG. 2 is a graph of the second and third Nyquist zones used by a repeater system according to one aspect.

The filters 156a, 156b, 158a, 158b can filter the signals output from the digital-to-analog converters 152a, 152b, 154a, 154b. The filters 156a, 156b can remove or otherwise reduce spurious and sampling images in a downlink direction. Filters 158a, 158b can remove or otherwise reduce spurious and sampling images in an uplink direction. FIG. 2 depicts the operation of filters 156a, 156b and/or the filters 158a, 158b using one Nyquist band. In the absence of aliasing, the frequency bands located in the first and second Nyquist zones (represented by the hatched band and the dark colored band) can be used. The absence of aliasing can be caused by using an intermediate frequency ("IF") bandwidth to be sampled that is narrower than a bandwidth of the Nyquist band.

In additional or alternative aspects, the digital-to-analog converters 152a, 152b, 154a, 154b can include internal mixing and/or interpolation functions. FIG. 2 depict a frequency spectrum obtained from the operation of filters 156a, 156b and/or the filters 158a, 158b using second and third Nyquist zone and the digital-to-analog converters 152a, 152b, 154a, 154b using internal mixing and/or interpolation. The sampling frequency ($f_s$) of the data can be one-half the data rate of the output of the digital-to-analog converters 152a, 152b, 154a, 154b. The complex data can be mixed and or interpolated by a factor of two. Additional mixing can allow a sampling frequency $f_{DAC}$ of $f_s \times 4$. Other interpolation products can be filtered out within the digital-to-analog converters 152a, 152b, 154a, 154b.

The mixers 160a, 160b can up-convert downlink signals to a correct RF frequency in a downlink direction. The power amplifiers 164a, 164b can adjust the gains of downlink signals to have a correct RF power level in a downlink direction. The mixers 162a, 162b can up-convert uplink signals to a correct RF frequency in an uplink direction. The power amplifiers 166a, 166b can adjust the gain of uplink signals to have a correct RF power level in an uplink direction.

As depicted in FIG. 1, each communication band can involve using four interfaces. For two communication bands, eight interfaces can be used. For four communication bands, sixteen interfaces can be used.

Issues presented by the telecommunication system 100 depicted in FIG. 1 can be reduced by using multiple Nyquist zone operations. Multiple carriers in multiple RF bands can be individually processed using non-overlapping intermediate frequencies that are combined together. In some aspects, multiple RF front ends may be used. In other aspects, one RF card with multiple RF paths using common broadband RF components (e.g., amplifiers) can be used. Signals having RF carriers with frequency differences larger than half of the sampling rate the signals can be sampled in different Nyquist zones by using a common local oscillator ("LO") signal. Over-folding issues can be prevented or mitigated by using different LO frequencies and mixers prior to combining and/or splitting of IF signals. Using a common LO to provide LO signals to different mixers having pre-filtering configured for specific Nyquist zones can reduce inter-modulation products generated by the mixers. For example, two RF signals in two Nyquist zones provided to a single mixer can generate signals at frequencies $f_{Ny,1}$, $f_{Ny,2}$ and $f_{LO}$ that can produce inter-modulation products.

Larger differences between IF frequencies can also be beneficial. Selecting suitable carrier signal IF frequencies and sampling rates can allow for more efficient use of analog-to-digital converters and digital-to-analog converters. Selecting suitable carrier signal IF frequencies and sampling rates can also allow for improved time coherence and/or phase coherence. The sampling rates of the analog-to-digital converters and digital-to-analog converters can be different.

Figure 3:
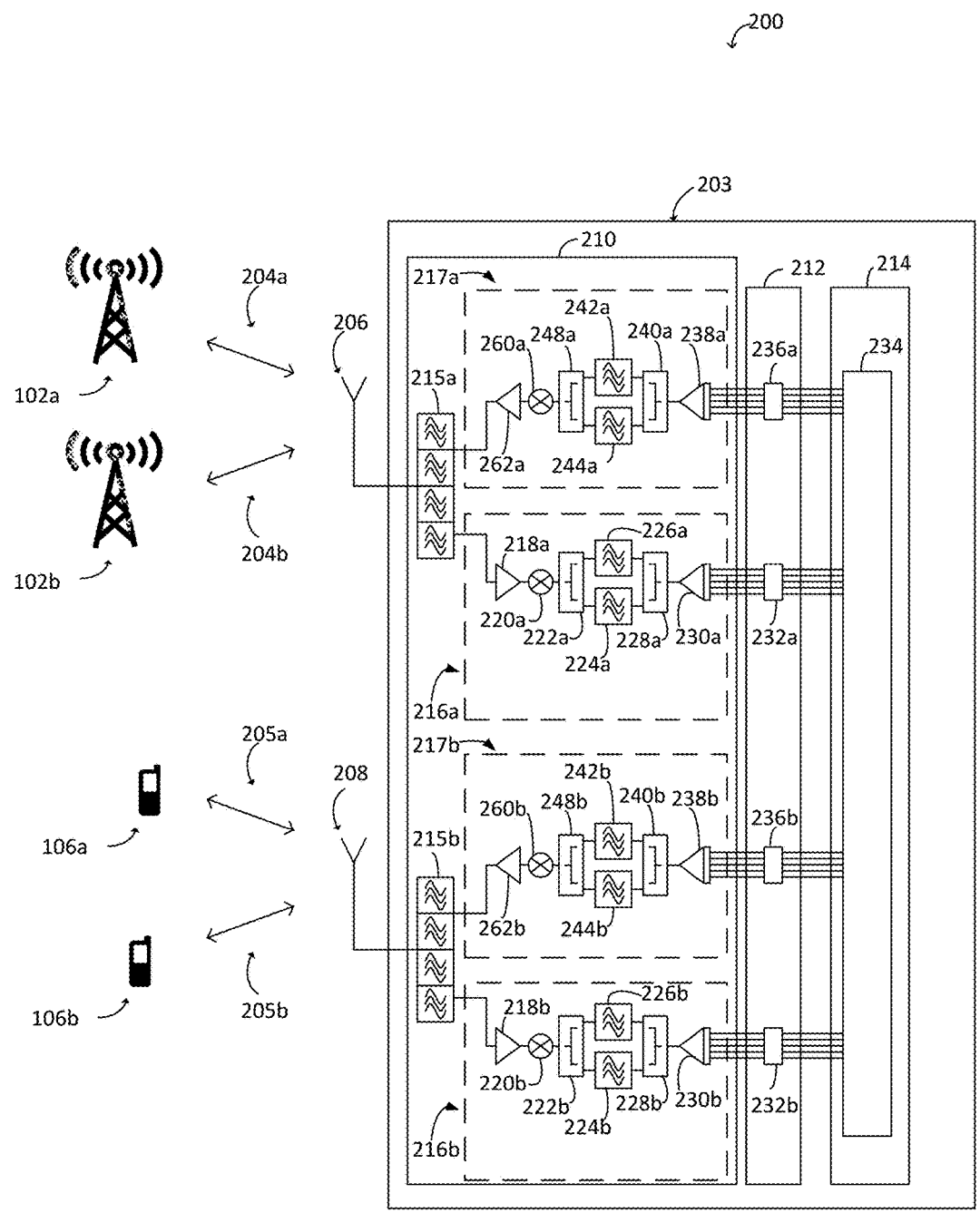
FIG. 3 is a schematic diagram of an example of a telecommunication system including a repeater configured for using multiple Nyquist zone operations to communicate signals in multiple frequencies bands according to one aspect.

FIG. 3 is a schematic diagram of an example of a telecommunication system 200 including a repeater 203 configured for using multiple Nyquist zone operations to communicate signals in multiple frequencies bands according to one aspect. The telecommunication system 200 can include a repeater 203 in communication with base stations 102a via donor communication links 204a, 204b and in communication with terminal devices 106a, 106b or other terminal devices via coverage communication links 205a, 205b. Non-limiting examples of the communication links 204a, 204b 204a, 204b can include GSM-900 links and LTE 800 links. For each of the donor communication links 204a, 204b, a donor antenna 206 can be used to establish downlink paths the base stations 102a, 102b to the repeater 203 and uplink paths from the repeater 203 to the respective base stations 102a, 102b. For each of the coverage communication links 205b, a coverage antenna 208 can be used to establish uplink paths from the terminal devices 106a, 106b to the repeater 203 and downlink paths from the repeater 203 to each of the terminal devices 106a, 106b.

Signals communicated via each of the communication links 204a, 204b, 205a, 205b can be processed by the repeater 203 using an RF card 210, an interface 212 and a processor 214.

On the donor side, downlink signals from base stations 102a, 102b are received via the antenna 206 and isolated from the donor uplink path using the duplexer 215a. Downlink signals on the donor side are processed using low noise amplifier 218a, mixer 220a, splitter 222a, filters 224a, 226a, combiner 228a, and analog-to-digital converters 230a. Uplink signals on the donor side are processed using digital-to-analog converters 238a, splitter 240a, filters 242a, 244a, combiner 248a, mixer 260a, and power amplifier 262a. Uplink signals on the donor side are transmitted to the base stations 102a, 102b via the antenna 206.

On the coverage side, uplink signals from terminal devices 106a, 106b are received via the antenna 208 and isolated from the coverage uplink path using the duplexer 215b. Uplink signals on the coverage side are processed using low noise amplifier 218b, mixer 220b, splitter 222b, filters 224b, 226b, combiner 228b, and analog-to-digital converters 230b. Downlink signals on the coverage are processed using digital-to-analog converters 238b, splitter 240b, filters 242b, 244b, combiner 248b, mixer 260b, and power amplifier 262b. Downlink signals on the coverage side are transmitted to the terminal devices 106a, 106b via the antenna 208.

In some aspects, a repeater 203 configured for frequency division multiplexing can use duplexers 215a, 215b such as (but not limited to) uplink/downlink duplexers to split or otherwise separate RF signals. Splitting or otherwise separating RF signals can allow filtering and amplifying of signals communicated in the downlink and uplink directions. On the donor side, the duplexer 215a can split or otherwise separate RF signals. In additional or alternative aspects, a repeater 203 configured for time division multiplexing can include switches in addition to or instead of the duplexers 215a, 215b.

Signals received by the repeater 203 can include downlink signals on the donor side and uplink signals on the coverage side. On the donor side, received downlink signals outputted by the duplexer 215a can be amplified by a low noise amplifier 218a. On the coverage side, received uplink signals outputted by the duplexer 215b can be amplified by a low noise amplifier 218b.

Received signals in an uplink or downlink direction can be down-converted. For signals received on the donor side, composite downlink signals can be down-converted by a frequency down mixer 220a. For signals received on the coverage side, composite uplink signals can be down-converted by a frequency down mixer 220b. A sampling rate for received signals can be selected such that RF signals down-converted to IF signals have frequencies that are located in at least two non-over folding parts of different Nyquist zones, such as the second and third Nyquist zones depicted in FIG. 1. In other aspects, other Nyquist zone combinations and/or complex sampling can be used. The down-converted signals can be split or otherwise separated by splitter/combiner 222a on the donor side and splitter/combiner 222b on the coverage side.

The repeater 203 can select frequency bands for received downlink signals on the donor side and/or received uplink signals on the coverage side. Selecting frequency bands for received signals can prevent or otherwise reduce an out-of-band spectrum from overlapping the frequency spectrum for the received signals. For signals received on the donor side, signal bands for received downlink signals can be selected by filters 224a, 226a. For signals received on the coverage side, signal bands for received uplink signals can be selected by filters 224b, 226b. Non-limiting examples of the filters 224a, 224b, 226a, 226b can include frequency selective filters or bandpass filters. The filtered signals can be combined using the splitter/combiner 228a on the donor side and the splitter/combiner 228b on the coverage side.

In additional or alternative aspects, one or more of the duplexers 215a, 215b and/or the splitter/combiners 228a, 228b can be omitted. A single SAW filter supporting a dual pass band can be used in addition to or in place of one or more of the duplexers 215a, 215b and/or the splitter/combiners 228a, 228b can be omitted. Combined signals outputted from the splitter/combiners 228a, 228b can be provided to the analog-to-digital converters 230a, 230b.

A digital data stream that includes information representing multiple received signals can be provided to the processor 214 via the interface 232a on the donor side and the interface 232b on the coverage side. Non-limiting examples of a processor 214 include a microprocessor, an ASIC, an FPGA, or other suitable processing device. The processor 214 can include a programmable filter 234. The programmable filter 234 can digitally filter the received signals. In some aspects, the received signals can be filtered based on specified frequency bands. In other aspects, the received signals can be filtered based on specified frequency channels.

Signals transmitted by the repeater 203 can include uplink signals on the donor side and downlink signals on the coverage side. A transmit direction can include an uplink direction on the donor side for transmission via the donor antenna 206 and/or a downlink direction of the coverage side for transmission via the coverage antenna 208. In a transmit direction, the processor 214 can provide digitally filtered signals to the digital-to-analog converter 238a via the interface 236a for uplink signals and to the digital-to-analog converter 238b via the interface 236b for downlink signals. The digital-to-analog converters 238a, 238b can output analog signals to be transmitted. The desired transmit signals (i.e., uplink signals) on the donor side can be split or otherwise separated via the splitter/combiner 240a. The desired transmit signals on the coverage side (i.e., downlink signals) can be split or otherwise separated via the splitter/combiner 240b. Intermediate frequencies for the desired transmit signals on the donor side (i.e., uplink signals) can be selected by filters 242a, 244a. Intermediate frequencies for the desired transmit signals on the coverage side (i.e., downlink signals) by filters 242b, 244b.

A sampling rate for the transmit signals can be selected as a multiple of the sampling rate for the received signals. In some aspects, complex sample signal generation can be used. Complex sample signal generation can allow different sampling rates to be used in a receive direction and a transmit direction. Due to the phase information contained in the complex data stream, over folding may not appear in each Nyquist zone. In some aspects, the transmit signal can be selected by a single transmit filter.

In some aspects, the transmit signals can be recombined via the splitter/combiners 248a, 248b. The frequencies of the transmit signals can be shifted to RF frequencies by the mixers 260a, 260b. The transmit signals can be provided to the donor antenna 206 and coverage antenna 208 via the respective power amplifiers 262a, 262b and the respective duplexers 215a, 215b.

Figure 4:
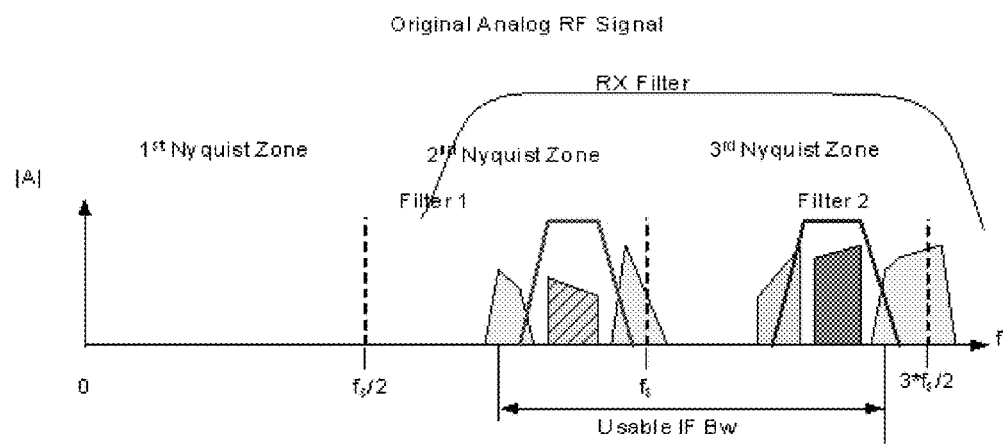
FIG. 4 is a graph of an example of an analog spectrum with desired frequency bands obtained using multiple Nyquist zone over-folding operations according to one aspect.

FIGS. 4-7 depict signal diagrams that show examples of signals undergoing multiple Nyquist zone operations performed by the repeater 203. FIG. 4 is a graph of an example of an analog spectrum with desired frequency bands obtained using multiple Nyquist zone over-folding operations according to one aspect. A second and third Nyquist zone over-folding operation can be used to communicate signals via one or more desired frequency bands. The desired frequency bands are represented by the hatched and dark bands. The received signal can be filtered by a wideband filter in a receive path. The wideband filter in the receive path can have a bandwidth that is at least wide enough to pass the desired frequency bands. In some aspects, the received signals in each desired frequency band can also be filtered by a band-selective bandpass filter (e.g., the filters 224a, 224b, 226a, 226b) to attenuate unwanted signals at frequencies outside the desired frequency bands.

Figure 5:
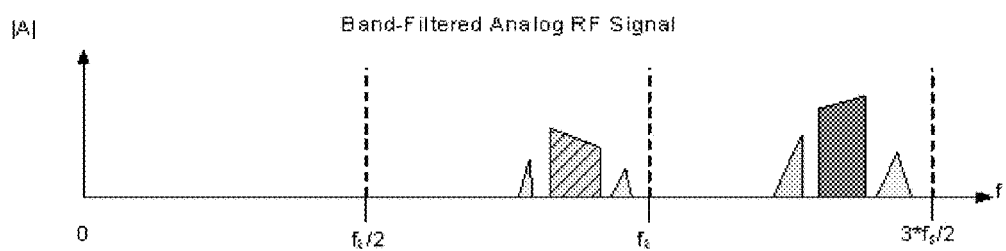
FIG. 5 is a graph of the example analog spectrum as filtered by a band-selective bandpass filter using multiple Nyquist zone over-folding operations according to one aspect.

FIG. 5 is a graph of the example analog spectrum as filtered by a band-selective bandpass filter using multiple Nyquist zone over-folding operations according to one aspect. FIG. 5 depicts the analog spectrum resulting from filtering the received signals using one of the filters 224a, 224b, 226a, 226b. Sampling the filtered received signals at an appropriate sampling frequency can allow desired frequency bands to be over-folded without aliasing. Over-folding the desired frequency bands can allow each desired frequency band to be represented in the discrete time domain without interference from other desired frequency bands or remnants of unwanted signals.

Figure 6:
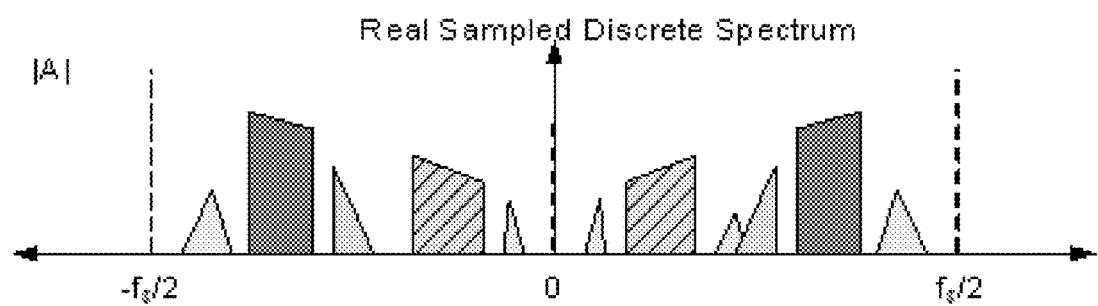
FIG. 6 is a graph of an example of a composite discrete time spectrum of a real sampling process according to one aspect.

FIG. 6 is a graph of an example of a composite discrete time spectrum of a real sampling process according to one aspect. The analog-to-digital converters 230a, 230b can perform real sampling to generate the discrete time spectrum. Signals in even-numbered Nyquist zones may be frequency inverted in the sampled spectrum generated by the sampling process performed by the analog-to-digital converters 230a, 230b. The frequency inversion can be removed using the processor 214 in the discrete time domain or using the mixers 220a, 220b during up-conversion in the analog domain.

Figure 7:
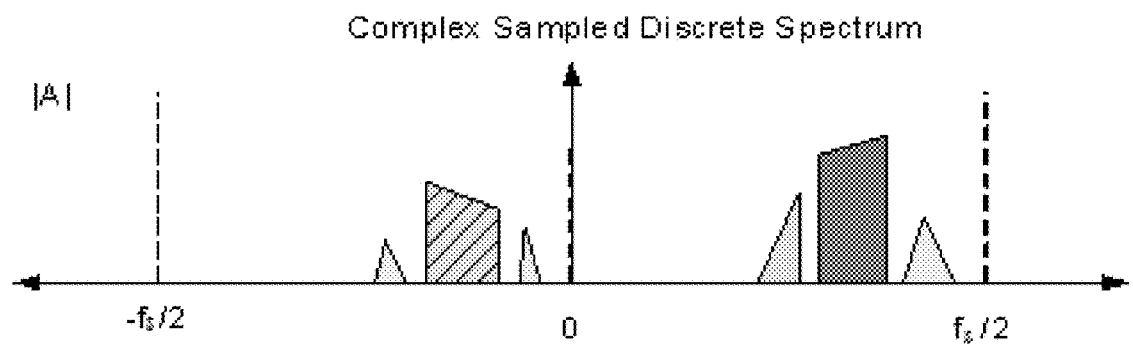
FIG. 7 is a graph of an example of a composite discrete time spectrum of a complex sampling process according to one aspect.

FIG. 7 is a graph of an example of a composite discrete time spectrum of a complex sampling process according to one aspect. FIG. 7 depicts the resulting discrete time spectrum of a complex sampling process. Either composite band can be used in the interfaces 232a, 232b or other common digital interfaces.

Figure 8:
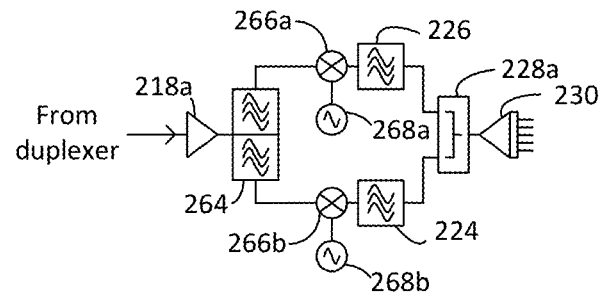
FIG. 8 is a schematic diagram of an example of a frequency conversion stage using dedicated mixers and local oscillators for different signal paths according to one aspect.
Figure 9:
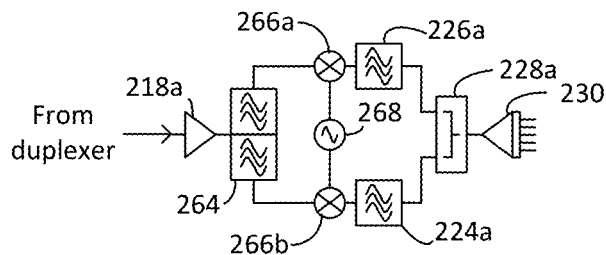
FIG. 9 is a schematic diagram of an example of a frequency conversion stage using dedicated mixers and a common local oscillator for different signal paths according to one aspect.
Figure 10:
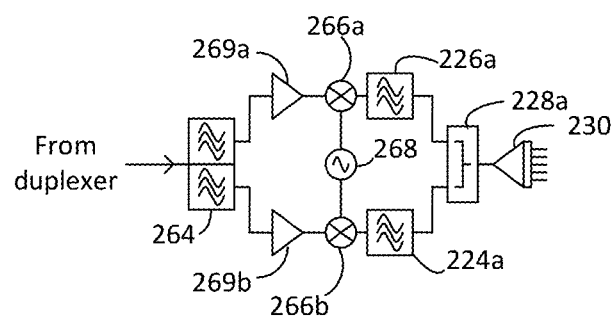
FIG. 10 is a schematic diagram of an example of a frequency conversion stage using dedicated mixers and low noise amplifiers for different signal paths according to one aspect.

In additional or alternative aspects, the downlink receiver section 216a and/or the uplink receiver section 216b can include multiple mixers, as depicted in FIGS. 8-10. Including multiple mixers can allow for individualized down-conversion with respect to one or more of the desired frequency bands.

In some aspects, the repeater 203 can include a dedicated mixer for each RF signal. For example, FIG. 8 is a schematic diagram of an example of a frequency conversion stage using dedicated mixers and local oscillators for different signal paths according to one aspect. The frequency conversion stage depicted in FIG. 8 can be implemented in the downlink receiver section 216a, the uplink receiver section 216b, or both. The frequency conversion stage can include a low noise amplifier 218, a duplexer 264, mixers 266a, 266b and LO signal generators 268a, 268b. Received signals from the frequency conversion stage can processed by the filters 224, 226, the combiner 228, and the analog-to-digital converter 230 in the downlink receiver section 216a, the uplink receiver section 216b, or both.

A duplexer 264 can split the received RF signals. The split RF signals can be down-converted by mixers 266a, 266b. The mixers 266a, 266b can respectively receive LO signals from the LO signal generators 268a, 268b. Using the mixer 266a for a first RF signal and the mixer 266b for a second RF signal can allow the repeater 203 to down-convert each RF signal to a respective IF specific to the RF signal. Down-converting each RF signal to a respective IF specific to the RF signal can be used to generate IF signals at frequencies in different Nyquist zones. Using IF signals in different Nyquist zones can provide optimal or otherwise improved inter-modulation conditions.

In some aspects, both of the mixers 266a, 266b can use a common LO signal. For example, FIG. 9 is a schematic diagram of an example of a frequency conversion stage using dedicated mixers and a common local oscillator for different signal paths according to one aspect. The received RF signals can be split by a duplexer 264. The split RF signals can be down-converted by mixers 266a, 266b. Different mixers 266a, 266b for different signal paths can be connected to a single LO signal generator 268. The LO signal generator 268 can provide a signal to each of the mixers 266a, 266b.

In additional or alternative aspects, dedicated low noise amplifiers can be used for each received signal. For example, FIG. 10 is a schematic diagram of an example of a frequency conversion stage using dedicated mixers and low noise amplifiers for different signal paths according to one aspect. The frequency conversion stage includes low noise amplifiers 269a, 269b for respective signal paths. Using separate low noise amplifiers 269a, 269b for the respective signals paths can reduce or eliminate unwanted inter-modulation products. For example, unwanted inter-modulation products can be caused by a pre-amplifier receiving signals at different frequencies due to the non-linearity of the pre-amplifier.

In additional or alternative aspects, the modifications to the downlink receiver section 216a and/or the uplink receiver section 216b described above can also be applied to one or both of the transmitter sections 217a, 217b. Additional power amplifiers can be included in between each of the filters 242a, 244a and the combiner 248a and/or additional power amplifiers can be included in between each of the filters 242b, 244b and the combiner 248b. Using additional power amplifiers prior to signal combining may prevent or otherwise reduce inter-modulation products generated by multiple RF signals being received by a single power amplifier.

Figure 11:
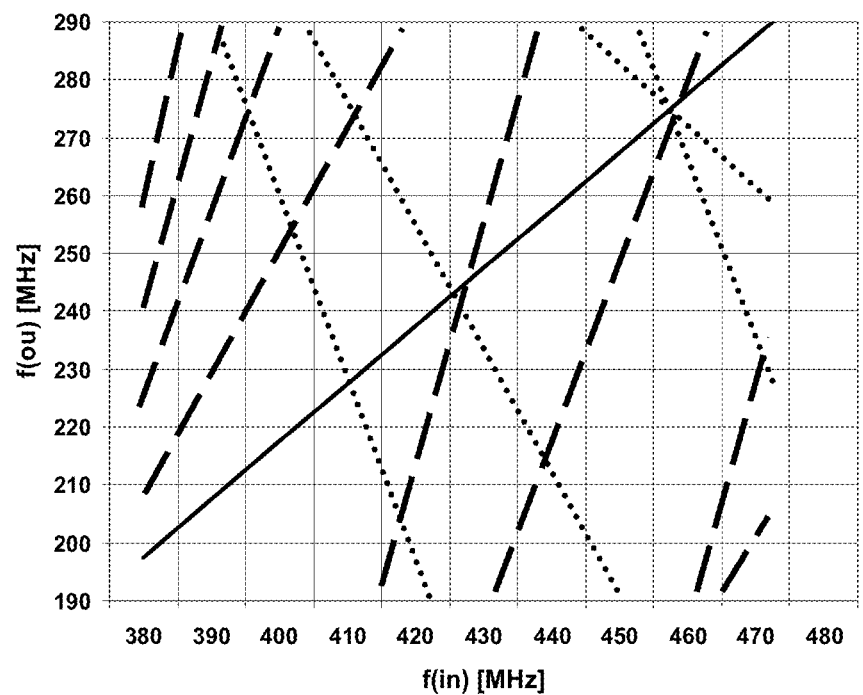
FIG. 11 is a graph of examples of inter-modulation products generated from down-converting an RF signal according to one aspect.

Individualized down-conversion can allow for selecting IF bands for each signal such that inter-modulation products are minimized or otherwise reduced. For example, FIG. 11 is a graph of examples of inter-modulation products generated from down-converting an RF signal. FIG. 11 depicts inter-modulation products that can be caused by using an LO signal of 182.5 MHz to down-convert signals having frequencies in a 380-470 MHz frequency band to signals having frequencies in a 197.5-287.5 MHz frequency band. Harmonics of each frequency generated in one or more of the mixers 220a, 220b, 260a, 260b can cause inter-modulation products having frequencies inside a targeted IF band. An optimum IF band can include as few inter-modulation products as possible or as few lower order inter-modulation products as possible. For example, as depicted in FIG. 11, an optimum IF band can be a frequency band with the fewest intersections with lines representing inter-modulation products. Optimal IF frequencies can be obtained by selecting suitable LO frequencies for LO signals provided to the mixers 220a, 220b, 260a, 260b. IF frequency bands can be obtained for non-overlapping parts of different Nyquist zones by choosing an appropriate sampling frequency.

Figure 12:
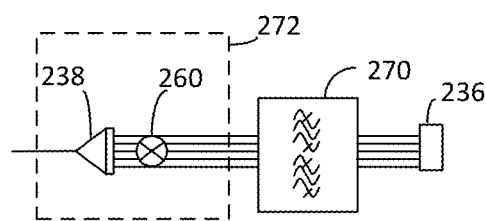
FIG. 12 is a schematic diagram of an alternative example of a digital transmit system using multiple Nyquist zone operations according to one aspect.

FIG. 12 is a schematic diagram of an alternative example of a digital transmit system using multiple Nyquist zone operations according to one aspect. As depicted in FIG. 12, a dual-band bandpass filter 270 and an RF digital-to-analog converter 272 can be included in one or both of the transmitter sections 217a, 217b. The dual-band bandpass filter 270 can select a desired frequency band from the signals received via an interface 236 (e.g., one or both of the interfaces 236a, 236b depicted in FIG. 3). A digital-to-analog converter 238 (e.g., one or both of the digital-to-analog converters 238a, 238b depicted in FIG. 3) can be included in the RF digital-to-analog converter 272.

In some aspects, the RF digital-to-analog converter 272 can include an integrated mixer 260, as depicted in FIG. 12. The integrated mixer 260 can digitally modulate signals. In additional or alternative aspects, integrated quadrature modulators can be used in combination with or instead of the integrated mixer 260.

In additional or alternative aspects, any combination of the implementations depicted in FIGS. 1, 3, and 9-10 can be used. In one non-limiting example, a telecommunication system can use one mixer in a receive path and two mixers in a transmit path. In another non-limiting example, the use of multiple Nyquist zone operations can be omitted from one of the uplink and the downlink path.

Figure 13:
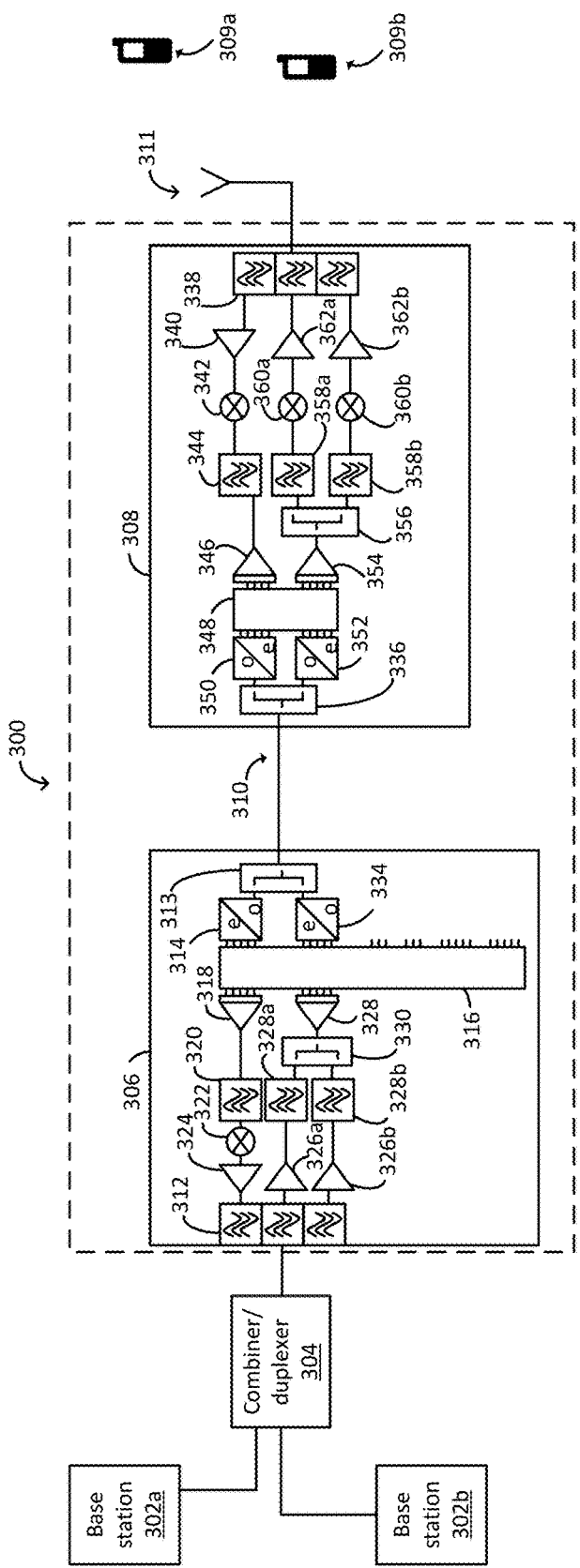
FIG. 13 is a schematic diagram of an example of a digital distributed antenna system configured for using multiple Nyquist zone operations to communicate signals in multiple frequencies bands according to one aspect.

In additional or alternative aspects, multiple Nyquist zone operations can be used by a distributed antenna system. FIG. 13 is a schematic diagram of an example of a digital distributed antenna system ("DDAS") 300 configured for using multiple Nyquist zone operations to communicate signals in multiple frequencies bands according to one aspect.

The DDAS 300 can communicate signals between base stations 302a, 302b and terminal devices 309a, 309b. Downlink signals can be coupled from the base stations 302a, 302b via directional couplers. The coupled downlink signals can be combined in a combiner/duplexer 304. The combiner/duplexer 304 can provide the combined signals to the DDAS 300.

The DDAS 300 can include a master unit 306 and at least one remote unit 308. In some aspects, the DDAS 300 can include multiple remote units 308 arranged in a parallel configuration or in a daisy chain configuration. The master unit 306 and remote unit(s) 308 can communicate via a communication medium 310. The communication medium 310 can be any suitable medium for providing a serial communication link between the master unit 306 and the remote unit 308. In some aspects, the communication medium 310 can be an optical fiber, as depicted in FIG. 13. In other aspects, the communication medium 310 can include copper cables, microwave links, etc. The master unit 306 and remote unit 308 can include parallel-serial and serial-parallel converters for digital communication over a serial link.

The master unit 306 can include an uplink path and multiple downlink paths between a duplexer 312 and a frequency multiplexer 313. The uplink path can include optical-to-electrical converter 314, a processor 316, a digital-to-analog converter 318, a filter 320, an up-conversion mixer 322, and a power amplifier 324. The downlink paths can include low-noise amplifiers 326a, 326a, filters 328a, 328b, a combiner 330, an analog-to-digital converter 332, the processor 316, and an electrical-to-optical converter 334.

The remote unit 308 can include an uplink path and multiple downlink paths between a frequency multiplexer 336 and a duplexer 338. The uplink path can include a low noise amplifier 340, a down-conversion mixer 342, a filter 344, an analog-to-digital converter 346, a processor 348, and an electrical-to-optical converter 350. The downlink paths can include an electrical-to-optical converter 350, the processor 348, a digital-to-analog converter 354, a splitter 356, filters 358a, 358b, up-conversion mixers 360a, 360b, and power amplifiers 362a, 362b.

The system depicted in FIG. 13 shows a configuration in which downlink signals are communicated using two Nyquist zones. In a downlink direction, the duplexer 312 can split or otherwise separate RF signals received by the master unit 306 from one or more of the base stations 302a, 302b. Downlink signals received from the duplexer 312 can be amplified by the low noise amplifiers 326a, 326b.

The master unit 306 can select desired frequency bands for downlink signals being communicated using multiple Nyquist zone operations. Desired frequency bands for downlink signals can be selected by the filters 328a, 328b. The desired frequency bands can correspond to different Nyquist zones. In some aspects, the Nyquist zones can be non-adjacent Nyquist zones, such as (but not limited to) a second and fourth Nyquist zone. Non-limiting examples of the filters 328a, 328b can include frequency selective filters or bandpass filters. The filtered signals can be combined using the combiner 330. Combined signals from the combiner 330 can be provided to the analog-to-digital converter 328.

A digital data stream that includes information representing multiple downlink signals can be provided to the processor 316. Non-limiting examples of a processor 316 include a microprocessor, an ASIC, an FPGA, or other suitable processing device. The processor 316 can include a programmable filter for digitally filtering the received signals. Signals can be routed to and combined from different remote units 308 in the processor 316 of the master unit 306.

The processor 316 can provide the digital downlink signals to the electrical-to-optical converter 334 for conversion to optical signals. The optical downlink signals can be transmitted to the remote antenna unit via the communication medium 310. The wavelength/frequency multiplexers 313, 336 can allow the master unit 306 and the remote unit 308 to communicate using a single communication medium 310 for both uplink signal and downlink signals. The optical-to-electrical converter 352 can convert the optical downlink signals to electrical downlink signals and provide the downlink signals to the processor 348. The processor 348 can provide the digital downlink signals to the digital-to-analog converter 354 for conversion to analog digital signals. The analog-to-digital converter can provide analog signals to the splitter 356. The splitter 356 can provide downlink signals to the filters 358a, 358b. The filtered downlink signals can be down-converted by the mixers 360a, 360b and amplified by the power amplifiers 362a, 362b for transmission to the terminal devices 309a, 309b.

In some aspects, uplink signals can be processed in a single Nyquist zone, as depicted in FIG. 13. In an uplink direction, a duplexer 338 can split or otherwise separate RF signals received by the remote unit 308 from the terminal device 309a, 309b. Splitting or otherwise separating RF signals can allow filtering and amplifying of signals communicated in the downlink and uplink directions. Uplink signals received from the duplexer 338 can be amplified by a low noise amplifier 340. Composite signals can be down-converted by a frequency down mixer 342.

Desired frequency bands of uplink signals can be selected by a filter 344. Non-limiting examples of the filter 344 can include frequency selective filters or bandpass filters. Selecting the desired frequency bands can prevent or otherwise reduce an out-of-band spectrum from overlapping the desired frequency bands. Filtered uplink signals can be provided to the analog-to-digital converter 346.

A digital data stream that includes information representing multiple received signals can be provided from the analog-to-digital converter 346 to the processor 348.

The digitally filtered signals can be converted from electrical signals to optical signals via the electrical-to-optical converter 350. The uplink signals can be provided to the master unit 306 via the communication medium 310. The uplink signals can be converted from optical signals to electrical signals via the optical-to-electrical converter 314. The electrical uplink signals can be provided to the processor 316 of the master unit 306. The processor 316 can provide the uplink signals to the digital-to-analog converter 318. The digital-to-analog converter 318 can output uplink signals for transmission to one or more of the base stations 302a, 302b. Intermediate frequencies in a desired frequency band for the uplink signals can be selected by filter 320. The frequency of the uplink signals can be shifted to their original frequencies by the mixer 322. The uplink signals from the mixer 322 can be amplified by the power amplifier 324 for transmission to the one or more of the base stations 302a, 302b.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A telecommunication system comprising:
   first circuitry configured to:
      receive signals from at least one transmitting base station or at least one transmitting terminal device, the received signals having frequencies in a plurality of frequency bands,
      generate, from the received signals, a plurality of sets of aliased signals by sampling the received signals such that the received signals are aliased, each set of aliased signals corresponding to signals in one of the plurality of frequency bands;
      combine the plurality of sets of aliased signals into a combined frequency band in a common Nyquist zone, wherein each of the plurality of sets of aliased signals are non-overlapping within the common Nyquist zone; and
   wherein at least one signal transmitted to at least one receiving base station or at least one receiving terminal device is derived from signals extracted from the combined frequency band to a frequency band from a Nyquist zone different than the common Nyquist zone.

2. The telecommunication system of claim 1, further comprising:
   second circuitry configured to:
      extract signals from the combined frequency band to the frequency band from a Nyquist zone different than the common Nyquist zone, and
      transmit, to the at least one receiving base station or the at least one receiving terminal device, signals at the frequencies corresponding to the extracted signals in the frequency band.

3. The telecommunication system of claim 2, wherein the second circuitry is further configured to:
   extract at least one additional signal from the combined frequency band to at least one additional frequency band from a Nyquist zone used as the common Nyquist zone, and
   transmit, to the at least one receiving base station or the at least one receiving terminal device, at least one additional signal at at least one additional frequency corresponding to the extracted at least one additional signal in the at least one additional frequency band.

4. The telecommunication system of claim 3,
   wherein the Nyquist zone used as the common Nyquist zone is a first Nyquist zone, and
   wherein the Nyquist zone different than the common Nyquist zone is a second Nyquist zone or a third Nyquist zone.

5. The telecommunication system of claim 2, wherein the second circuitry is further configured to:
   extract at least one additional signal from the combined frequency band to at least one additional frequency band from an additional Nyquist zone different from the common Nyquist zone, and
   transmit, to the at least one receiving base station or the at least one receiving terminal device, at least one additional signal at the at least one additional frequency corresponding to the extracted at least one additional signal in the at least one additional frequency band.

6. The telecommunication system of claim 5,
   wherein the Nyquist zone used as the common Nyquist zone is a first Nyquist zone,
   wherein the Nyquist zone different than the common Nyquist zone is a second Nyquist zone, and
   wherein the additional Nyquist zone different than the common Nyquist zone is a third Nyquist zone.

7. The telecommunication system of claim 5, wherein the Nyquist zone different than the common Nyquist zone is not adjacent to the additional Nyquist zone different than the common Nyquist zone.

8. The telecommunication system of claim 5, wherein the first circuitry is configured to:
   down-convert the received signals to at least one intermediate frequency;
   receive the down-converted signals from the down-conversion stage;
   select down-converted signals in the first frequency band, wherein the first frequency band corresponds to the Nyquist zone different than the common Nyquist zone;
   receive the down-converted signals from the down-conversion stage;
   select down-converted signals in the second frequency band, wherein the second frequency band corresponds to the additional Nyquist zone different than the common Nyquist zone; and
   combine the selected signals in the first and second frequency bands, wherein the first section is configured to sample the combined down-converted signals.

9. The telecommunication system of claim 2, wherein the second circuitry is configured to:
   convert the digital signals to be transmitted using a second sampling rate different from the first sampling rate.

10. The telecommunication system of claim 2, wherein the telecommunication system comprises a repeater; and wherein the first circuitry is configured to:
　receive downlink signals from a donor antenna; and
　receive uplink signals from a coverage antenna;
wherein the second circuitry is configured to:
　transmit the downlink signals using an additional coverage antenna; and
　transmit the uplink signals using an additional donor antenna.

11. The telecommunication system of claim 2,
wherein the telecommunication system comprises a distributed antenna system comprising:
　a master unit configured to receive downlink signals from the at least one transmitting base station in the plurality of frequency bands; and
　a remote unit communicatively coupled to the master unit, the remote unit configured to transmit the downlink signals extracted from the combined frequency band to the at least one receiving terminal device;
wherein the master unit comprises the first circuitry; and
wherein the remote unit comprises the second circuitry.

12. The telecommunication system of claim 1, wherein the common Nyquist zone is a first Nyquist zone and the Nyquist zone different than the common Nyquist zone is a second Nyquist zone or a third Nyquist zone.

13. The telecommunication system of claim 1, wherein the first circuitry is further configured to generate digital signals by sampling the received signals at a first sampling rate.

14. The telecommunication system of claim 1, wherein the telecommunication system comprises a repeater.

15. A method comprising:
　receiving signals from at least one transmitting base station or at least one transmitting terminal device, the received signals having frequencies in a plurality of frequency bands;
　generating, from the received signals, a plurality of sets of aliased signals by sampling the received signals such that the received signals are aliased, each set of aliased signals corresponding to signals in one of the plurality of frequency bands;
　combining the plurality of sets of aliased signals into a combined frequency band in a common Nyquist zone, wherein each of the plurality of sets of aliased signals are non-overlapping within the common Nyquist zone;
　extracting at least one signal from the combined frequency band to a Nyquist zone different than the common Nyquist zone; and
　transmitting, to at least one receiving base station or at least one receiving terminal device, at least one signal at a frequency corresponding to the extracted at least one signal in the frequency band.

16. The method of claim 15, further comprising:
extracting at least one additional signal from the combined frequency band, and
transmitting, to the at least one receiving base station or the at least one receiving terminal device, the extracted at least one additional signal at at least one additional frequency in at least one additional frequency band from the common Nyquist zone.

17. The method of claim 15, further comprising:
extracting at least one additional signal from the combined frequency band to at least one additional frequency band from an additional Nyquist zone different from the common Nyquist zone, and
transmitting, to the at least one receiving base station or the at least one receiving terminal device, at least one additional signal at additional frequencies corresponding to the extracted at least one additional signal.

18. A distributed antenna system comprising:
a master unit communicatively coupled to a base station, the master unit configured to:
　receive downlink signals from the base station, the downlink signals having frequencies in a plurality of frequency bands;
　select a subset of frequency bands;
　generate, from the received downlink signals, a plurality of sets of aliased downlink signals by sampling the received signals such that the received signals are aliased, each set of aliased downlink signals corresponding to signals in one of the subset of frequency bands; and
　combine the plurality of sets of aliased downlink signals into a combined frequency band in a common Nyquist zone, wherein each of the plurality of sets of aliased downlink signals are non-overlapping within the common Nyquist zone; and
a remote unit communicatively coupled to the master unit, the remote unit configured to:
　extract at least one signal from the combined frequency band to at least one frequency band from a Nyquist zone different than the common Nyquist zone; and
　transmit to at least one receiving terminal device, at least one signal at a frequency corresponding to the extracted at least one signal in the at least one frequency band.

19. The distributed antenna system of claim 18, wherein the remote unit is further configured to:
extract at least one additional signal from the combined frequency band to at least one additional frequency band from a Nyquist zone used as the common Nyquist zone, and
transmit, to the at least one receiving terminal device, at least one additional signal at at least one additional frequency corresponding to the at least one additional extracted signals in the at least one additional frequency band.

20. The distributed antenna system of claim 18, wherein the remote unit is further configured to:
extract at least one additional signal from the combined frequency band to at least one additional frequency band from an additional Nyquist zone different from the common Nyquist zone; and
transmit, to the at least one receiving terminal device, at least one additional signal at at least one additional frequency corresponding to the extracted at least one additional signal in the at least one additional frequency band.

* * * * *